United States Patent [19]

Furuta et al.

[11] Patent Number: 5,099,442
[45] Date of Patent: Mar. 24, 1992

[54] FURNACE TEMPERATURE CONTROL APPARATUS USING ADJUSTMENT INPUT

[75] Inventors: Katsuhisa Furuta, 44-15 Minami Oizumi 4-Chome, Nerima-ku, Tokyo, Japan; Iwao Ashahi; Akinori Ito; Nobuhisa Akaba; Chitoshi Yamada, all of Tokyo, Japan

[73] Assignees: Ohkura Electric Co., Ltd.; Katsuhisa Furuta, both of Tokyo, Japan

[21] Appl. No.: 605,692

[22] Filed: Oct. 30, 1990

[30] Foreign Application Priority Data

Nov. 4, 1989 [JP] Japan ................................. 1-286042

[51] Int. Cl.⁵ ................. G05D 23/30; G06F 15/46
[52] U.S. Cl. ............................. 364/557; 364/150; 364/477; 432/24
[58] Field of Search ................ 364/550, 551.01, 578, 364/557, 148-151, 477; 432/24, 36; 219/486, 506; 236/15 BG, 46 R

[56] References Cited

U.S. PATENT DOCUMENTS

| | | | |
|---|---|---|---|
| 3,311,303 | 3/1967 | Noyes | 236/46 R |
| 3,601,588 | 8/1971 | Bristol, II | 364/151 |
| 3,911,347 | 10/1975 | Hartung | 318/632 |
| 4,255,133 | 3/1981 | Tanifuji et al. | 432/24 |
| 4,539,663 | 9/1985 | Ishibashi et al. | 369/34 |
| 4,688,180 | 8/1987 | Motomiya | 364/477 |
| 4,904,912 | 2/1990 | Yamamoto | 364/150 |
| 4,907,177 | 3/1990 | Curreri et al. | 364/557 |
| 4,948,365 | 8/1990 | Yuen | 432/112 |
| 4,982,347 | 1/1991 | Rackerby et al. | 364/557 |
| 5,003,160 | 3/1991 | Matsuo et al. | 219/506 |

FOREIGN PATENT DOCUMENTS 0256842 2/1988 European Pat. Off. .
8807708 10/1988 PCT Int'l Appl. .

*Primary Examiner*—Parshotam S. Lall
*Assistant Examiner*—M. J. Zanelli
*Attorney, Agent, or Firm*—Oblon, Spivak, McClelland, Maier & Neustadt

[57] ABSTRACT

A temperature control apparatus of a learning type for a furnace which runs repetitively with a certain operating pattern of temperature change with time. The apparatus has a dual system model with respect to an enlarged system consisting of the furnace and its controller. For each cycle of the repetition of the certain operating pattern, adjustment input (f̂) is calculated by using the dual system model and the error between the preset temperature values (r) for the pattern and the actual inside temperatures (y) of the furnace, which adjustment input (f̂) is applied to the enlarged system to cause the inside temperatures (y) to track the preset temperature values (r). After each cycle of operation, the adjustment input (f̂) is renewed using the latest value of the above error.

12 Claims, 13 Drawing Sheets

FURNACE TEMPERATURE CONTROL APPARATUS USING ADJUSTMENT INPUT

BACKGROUND OF THE INVENTION

1. Field of the Invention

This invention relates to a furnace temperature control apparatus using adjustment input. In particular, the invention relates to an apparatus for temperature control of a furnace running in repetition of a certain operating pattern of temperature change with time, which apparatus suppresses furnace temperature change due to regularly occurring operating pattern.

2. Description of the Prior Art

A typical furnace system will be briefly reviewed by referring to FIG. 9. A furnace 1 has a body 1a carrying a plurality (e.g., p pieces) of heaters 2. A plurality (e.g., s pieces, s>p) of temperature sensors 3 are disposed in and around the furnace 1 at positions suitable for measuring the state (x) such as temperature of the furnace 1. It is assumed here that the control variables are a set of inside temperatures (y) at m points (m<s) in the furnace 1. The control variables in this case are a part of the state (x).

FIG. 24 shows a block diagram of a conventional controller 12 for controlling the temperature of the furnace 1. The state (x) and the inside temperatures (y) are fed back to the controller 12, and the controller 12 generates p pieces of manipulating variables (u), representing magnitudes of quantities (to be manipulated), so as to minimize errors (e) of the inside temperatures (y) from corresponding preset values (r) therefor. The manipulating variables (u) are applied to the heaters 2 of the furnace 1.

To control digitally the furnace 1, the state (x) of the furnace 1 is given by the following discrete state equation, and the furnace temperature control is generally treated as a servo problem using the multi-variable control theory.

$$x(k+1) = Ax(k) + Bu(k)$$

$$y(k) = Cx(k)$$

here,
- $x(k)$: state vector at time k, being a real vector of s dimension.
- $u(k)$: manipulating variable vector at time k, being a real vector of p dimension
- $y(k)$: control variable vector at time k, being a real vector of m dimension
- A: an s-row s-column matrix of real coefficients
- B: an s-row p-column matrix of real coefficients
- C: an m-row s-column matrix of real coefficients With the controller 12 of FIG. 24, it is possible to deal effectively with various changes, such as step-like changes in target values and disturbances. In practice, the furnace 1 is often run in repetition of a certain operating pattern of temperature change with time, such as the curve T of FIG. 11C, which pattern is given in the form of a series of preset temperature values (r). With the conventional controller 12, each cycle of the repetition is carried out in the above-mentioned manner so as to run as closely to the certain operating pattern as possible.

However, it is not possible with the conventional controller 12 to improve the tracking performance with respect to the certain operating pattern T even after repeated runs of such pattern T. The tracking performance refers to the closeness of the actual inside temperatures (y) of the furnace 1 to the preset temperature values (r) representing the operating pattern T. Further, actual run of the furnace 1 often encounters repetitive disturbances occurring at certain timing in each cycle of the operating pattern T, such as loading and unloading of works. The conventional controller 12 cannot reduce the effects of such repetitive disturbances even after repeated runs thereof.

SUMMARY OF THE INVENTION

Therefore, an object of the present invention is to provide a temperature control apparatus for a furnace running in repetition of a certain operating pattern with preset temperature values, which apparatus uses adjustment input so as to suppress furnace temperature change caused by regularly occurring disturbance.

To this end, the invention uses a dual system model and adjustment input; namely, a dual system model with respect to an enlarged system consisting of the furnace and its controller under certain conditions, and adjustement input which is generated by using the dual system model.

Another object of the invention is to provide a temperature control apparatus for a furnace running in repetition of a certain operating pattern with preset temperature values, which apparatus uses adjustment input so as to improve the tracking performance with respect to the operating pattern.

Referring to FIG. 1 and FIG. 9, the temperature control apparatus of the invention controls the inside temperatures (y) of a furnace 1 which repeats a certain operating pattern given by preset temperature values (r), such as the curve T of FIG. 11C. The inside temperatures (y) detected by sensors 3 are applied to the controller 12 of conventional type, and simultaneously the preset temperature values (r) and adjustment input ($\hat{r}$) are applied to the controller 12 from the corresponding memories in the example of FIG. 1. However, it is sufficient in the invention to apply either the preset temperature values (r) or the adjustment input ($\hat{r}$) to the controller 12. The adjustment input ($\hat{r}$) must be applied to an enlarged system 40 consisting of the furnace 1 and the controller 12 in synchronism with the application of the inside temperatures (y) to the controller 12. The output signals from the controller 12 form all or a part of the signals of manipulating variable (u) applicable to the heaters 2 of the furnace 1.

A preset temperature value memory 7 (sometimes referred to as "r memory") stores the preset temperature values (r), and an adjustment input memory 11 (sometimes referred to as "$\hat{r}$ memory") stores the adjustment input ($\hat{r}$) for each cycle of the repetition of the operating pattern T. The initial value of the adjustment input ($\hat{r}$), or its value for the first run of repetition of the operating pattern T, is zero. With the invention, the value of the adjustment input ($\hat{r}$) can be renewed after completion of each cycle of such repetition in a manner to be described hereinafter.

It is important to use a dual system model 9 with respect to the above-referred enlarged system 40 under the condition of being disconnected from the preset temperature values (r). An adjustment input generator 10 renews the adjustment input ($\hat{r}$) based on a combination of the adjustment input ($\hat{r}$) values in a preceding cycle of the repetition and an output (v) from the dual system model 9 in response to application of errors (e)

between the preset temperature values (r) and the latest inside temperatures (y).

The principles of the invention will be described now by referring to the example of FIG. 1 and FIG. 9. If the furnace 1 is a dynamic system whose characteristics do not change with time, its thermal characteristics can be represented by a block diagram of FIG. 11A and the following equation (1).

$$x(k + 1) = Ax(k) + Bu(k) + d(k)$$
$$y(k) = Cx(k) \quad (1)$$

Here, x(k) represents state signals of s dimension which are temperatures detected by the sensors 3, u(k) represents manipulating variable signals (u) of p dimension to be applied to the heaters 2, d(k) represents a disturbance, and y(k) represents output signals of m dimension from the furnace 1 in the form of inside temperatures. A, B, and C are s-row s-column, s-row p-column, and m-row s-column matrices of real coefficients, respectively.

In the equation (1), the furnace output y(k) is given as a quantity obtained by converting the state signal x(k). In particular, the block diagram of FIG. 11A shows that six output signals from six sensors 3 form the state signal x(k), and the furnace output y(k) is obtained by a conversion which selects three out of six signals of x(k). The matrix C of the equation (1) shows such selection.

When the controller 12 has a formation of FIG. 11B, the state of the enlarged system 40 of FIG. 11A comprising the furnace 1 and the controller 12 can be given by the following equations (2a) and (2b).

$$\begin{bmatrix} x(k+1) \\ \xi(k+1) \end{bmatrix} = \begin{bmatrix} A + BF_1 & BF_2 \\ C & I \end{bmatrix} \begin{bmatrix} x(k) \\ \xi(k) \end{bmatrix} + \begin{bmatrix} B & 0 \\ 0 & I \end{bmatrix} \begin{bmatrix} \hat{r}_1(k) \\ \hat{r}_2(k) \end{bmatrix} + \begin{bmatrix} 0 \\ -I \end{bmatrix} r(k) + \begin{bmatrix} I \\ 0 \end{bmatrix} d(k) \quad (2a)$$

$$y(k) = [C \; 0] \begin{bmatrix} x(k) \\ \xi(k) \end{bmatrix} \quad (2b)$$

here, $F_1$ and $F_2$ are matrices of real coefficients, and I is a unit matrix. The equations (2a) and (2b) can be simplified into equations (4a) and (4b) by using the following relationship.

$$X(k) = \begin{bmatrix} x(k) \\ \xi(k) \end{bmatrix} \quad \bar{A} = \begin{bmatrix} A + BF_1 & BF_2 \\ C & I \end{bmatrix}$$

$$\hat{r} = \begin{bmatrix} \hat{r}_1(k) \\ \hat{r}_2(k) \end{bmatrix} \quad \bar{B} = \begin{bmatrix} B & 0 \\ 0 & I \end{bmatrix} \quad (3)$$

$$\bar{C} = [C \; 0] \quad \bar{G}_1 = \begin{bmatrix} 0 \\ -I \end{bmatrix} \quad \bar{G}_2 = \begin{bmatrix} I \\ 0 \end{bmatrix}$$

$$X(k + 1) = \bar{A}X(k) + \bar{B}\hat{r}(k) + \bar{G}_1 r(k) + \bar{G}_2 d(k) \quad (4a)$$

$$y(k) = \bar{C}X(k) \quad (4b)$$

If it is assumed that X(0)=0 (this assumption does not jeopardize the generality because the system of the invention is linear), the equations (4a) and (4b) result in $$\begin{bmatrix} y(1) \\ y(2) \\ \vdots \\ y(k) \\ \vdots \\ y(n) \end{bmatrix} = \begin{bmatrix} \bar{C}\bar{B}, & 0, & 0, & \ldots, \ldots, & , & 0 \\ \bar{C}\bar{A}\bar{B}, & \bar{C}\bar{B}, & 0, & \ldots, \ldots, & , & 0 \\ \vdots & & & & & \\ \bar{C}\bar{A}^{k-1}\bar{B}, & \bar{C}\bar{A}^{k-2}\bar{B}, & \bar{C}\bar{A}^{k-3}\bar{B}, & \ldots, \ldots, & \bar{C}\bar{B}, 0 & \ldots, 0 \\ \vdots & & & & & \\ \bar{C}\bar{A}^{n-1}\bar{B}, & \bar{C}\bar{A}^{n-2}\bar{B}, & \bar{C}\bar{A}^{n-3}\bar{B}, & \ldots, \ldots, & , \ldots, & \bar{C}\bar{B} \end{bmatrix} \begin{bmatrix} \hat{r}(0) \\ \hat{r}(1) \\ \vdots \\ \hat{r}(k-1) \\ \vdots \\ \hat{r}(n-1) \end{bmatrix} + \quad (5)$$

$$\begin{bmatrix} \bar{C}\bar{G}_1, & 0, & 0, & \ldots, \ldots, & . & . & 0 \\ \bar{C}\bar{A}\bar{G}_1, & \bar{C}\bar{G}_1, & 0, & \ldots, \ldots, & . & . & 0 \\ \vdots & & & & & & \\ \bar{C}\bar{A}^{k-1}\bar{G}_1, & \bar{C}\bar{A}^{k-2}\bar{G}_1, & \bar{C}\bar{A}^{k-3}\bar{G}_1, & \ldots, \ldots, & \bar{C}\bar{G}_1, \ldots, & 0 \\ \vdots & & & & & & \\ \bar{C}\bar{A}^{n-1}\bar{G}_1, & \bar{C}\bar{A}^{n-2}\bar{G}_1, & \bar{C}\bar{A}^{n-3}\bar{G}_1, & \ldots, \ldots, & , \ldots, & \bar{C}\bar{G}_1 \end{bmatrix} \begin{bmatrix} \hat{r}(0) \\ \hat{r}(1) \\ \vdots \\ \hat{r}(k-1) \\ \vdots \\ \hat{r}(n-1) \end{bmatrix} +$$

$$\begin{bmatrix} \bar{C}\bar{G}_2, & 0, & 0, & \ldots, \ldots, & , & , & 0 \\ \bar{C}\bar{A}\bar{G}_2, & \bar{C}\bar{G}_2, & 0, & \ldots, \ldots, & , & , & 0 \\ \vdots & & & & & & \\ \bar{C}\bar{A}^{k-1}\bar{G}_2, & \bar{C}\bar{A}^{k-2}\bar{G}_2, & \bar{C}\bar{A}^{k-3}\bar{G}_2, & \ldots, \ldots, & \bar{C}\bar{G}_2, \ldots, & 0 \\ \vdots & & & & & & \\ \bar{C}\bar{A}^{n-1}\bar{G}_2, & \bar{C}\bar{A}^{n-2}\bar{G}_2, & \bar{C}\bar{A}^{n-3}\bar{G}_2, & \ldots, \ldots, & , \ldots, & \bar{C}\bar{G}_2 \end{bmatrix} \begin{bmatrix} d(0) \\ d(1) \\ \vdots \\ d(k-1) \\ \vdots \\ d(n-1) \end{bmatrix}$$

Here, $\hat{r}$ represents the adjustment input which will be described hereinafter, (r) represents preset temperature values, and d(k) represents disturbance. With the following definitions, the equation (5) will be simplified into the form of equation (5a).

$$\underline{Y} = \begin{bmatrix} y(1) \\ y(2) \\ \vdots \\ y(k) \\ \vdots \\ y(n) \end{bmatrix} \tag{6a}$$

$$\underline{A} = \begin{bmatrix} \bar{C}\bar{B}, & 0, & 0, & \ldots, \ldots, & , & 0 \\ \bar{C}\bar{A}\bar{B}, & \bar{C}\bar{B}, & 0, & \ldots, \ldots, & , & 0 \\ \vdots & & & & & \\ \bar{C}\bar{A}^{k-1}\bar{B}, & \bar{C}\bar{A}^{k-2}\bar{B}, & \bar{C}\bar{A}^{k-3}\bar{B}, & \ldots, \ldots, & \bar{C}\bar{B}, \ldots, & 0 \\ \vdots & & & & & \\ \bar{C}\bar{A}^{n-1}\bar{B}, & \bar{C}\bar{A}^{n-2}\bar{B}, & \bar{C}\bar{A}^{n-3}\bar{B}, & \ldots, \ldots, & , \ldots, & \bar{C}\bar{B} \end{bmatrix} \tag{6b}$$

$$\underline{\hat{R}} = \begin{bmatrix} \hat{r}(0) \\ \hat{r}(1) \\ \vdots \\ \hat{r}(k-1) \\ \vdots \\ \hat{r}(n-1) \end{bmatrix} \tag{6c}$$

$$\underline{G}_1 = \begin{bmatrix} \bar{C}\bar{G}_1, & 0, & 0, & \ldots, \ldots, & , & ; & 0 \\ \bar{C}\bar{A}\bar{G}_1, & \bar{C}\bar{G}_1, & 0, & \ldots, \ldots, & , & ; & 0 \\ \vdots & & & & & & \\ \bar{C}\bar{A}^{k-1}\bar{G}_1, & \bar{C}\bar{A}^{k-2}\bar{G}_1, & \bar{C}\bar{A}^{k-3}\bar{G}_1, & \ldots, \ldots, & \bar{C}\bar{G}_1, \ldots, & 0 \\ \vdots & & & & & & \\ \bar{C}\bar{A}^{n-1}\bar{G}_1, & \bar{C}\bar{A}^{n-2}\bar{G}_1, & \bar{C}\bar{A}^{n-3}\bar{G}_1, & \ldots, \ldots, & , \ldots, & \bar{C}\bar{G}_1 \end{bmatrix} \tag{6d}$$

$$\underline{R} = \begin{bmatrix} r(0) \\ r(1) \\ \vdots \\ r(k-1) \\ \vdots \\ r(n-1) \end{bmatrix} \quad (6e)$$

$$\underline{G_2} = \begin{bmatrix} \overline{CG_2}, & 0, & 0, & \ldots, \ldots, & , & , 0 \\ \overline{CAG_2}, & \overline{CG_2}, & 0, & \ldots, \ldots, & ; & , 0 \\ \vdots \\ \overline{CA}^{k-1}\overline{G_2}, & \overline{CA}^{k-2}\overline{G_2}, & \overline{CA}^{k-3}\overline{G_2}, & \ldots, \ldots, & \overline{CG_2}, \ldots, & 0 \\ \vdots \\ \overline{CA}^{n-1}\overline{G_2}, & \overline{CA}^{n-2}\overline{G_2}, & \overline{CA}^{n-3}\overline{G_2}, & \ldots \ldots, & , \ldots, & \overline{CG_1} \end{bmatrix} \quad (6f)$$

$$\underline{D} = \begin{bmatrix} d(0) \\ d(1) \\ \vdots \\ d(k-1) \\ \vdots \\ d(n-1) \end{bmatrix} \quad (6g)$$

$$\underline{Y} = \underline{A}\hat{\underline{R}} + \underline{G_1}\underline{R} + \underline{G_2}\underline{D} \quad (5a)$$

Thus, the deviation $\underline{E}$ of the output $\underline{Y}$, or the furnace inside temperatures (y), from the set value $\underline{R}$, or the preset temperature values (r), is given by $$\underline{E} = \underline{Y} - \underline{R} = (A\hat{\underline{R}} + G_1 \underline{R} + G_2\underline{D}) - \underline{R} \quad (7)$$

It is noted here that the preset value which corresponds to the inside temperatures (y) in the above equations is not r(k−1), being used for determination of y(k), but that preset temperature values r(k) which is to be used together with the output y(k) for determination of the next ensuing value. Hence, the preset temperature value to be used with the last output y(n) in a given time series is not r(n−1) but r(n). In the equation (6e), the preset temperature values are defined up to r(n−1) which is used to determine the last output y(n).

The inventors noted that the above-referred error $\underline{E}$ can be reduced by selecting proper value of the adjustment input ($\hat{r}$). In particular, at the (i+1)th renewal for determining the adjustment input values $\hat{\underline{R}}^{i+1}$ based on the preceding ith value $\hat{\underline{R}}^i$, the following equation (8) is used while considering the evaluation function J of the equation (9). The adjustment input $\hat{\underline{R}}$ is renewed in such a manner that the evaluation function J is reduced at each renewal, which evaluation function is determined on the basis of the error $\underline{E}$ of the equation (7) between the output $\underline{Y}$ and the preset temperature values $\underline{R}$(r).

$$\hat{\underline{R}}^{i+1} = \hat{\underline{R}}^i + \epsilon^i \underline{V}^i \quad (8)$$

Here, $\epsilon^i$ is a parameter which determines the speed of convergence, and $\underline{V}$ is a variable of the following form.

$$\underline{V} = \begin{bmatrix} v(0) \\ v(1) \\ \vdots \\ v(n-1) \end{bmatrix} \quad (9)$$

$$J^i = \|\underline{Y}^i - \underline{R}\|^2 = \|\underline{E}^i\|^2$$

The evaluation function J of the equation (9) increases and decreases with the norm of the above error $\underline{E}$. Now, let us find out such variable $\underline{V}$ which reduces the evaluation function J at each renewal.

In view of the equations (5a) and (8), increment or decrement of the output $\underline{Y}$ due to the above renewal of the adjustment input is given by $$\begin{aligned} \underline{Y}^{i+1} - \underline{Y}^i &= \underline{A}\hat{\underline{R}}^{i+1} + \underline{G_1}\underline{R} + \underline{G_2}\underline{D}) - (\underline{A}\hat{\underline{R}}^i + \underline{G_1}\underline{R} + \underline{G_2}\underline{D}) \\ &= \underline{A}(\hat{\underline{R}}^{i+1} - \hat{\underline{R}}^i) \\ &= \underline{A}(\hat{\underline{R}}^i + \epsilon^i\underline{V}^i - \hat{\underline{R}}^i) \\ &= \epsilon^i \underline{A}\underline{V}^i \end{aligned}$$

Thus, $$\underline{E}^{i+1} = \underline{Y}^{i+1} - \underline{R} = \underline{Y}^i + \epsilon^i \underline{A}\underline{V}^i - \underline{R} = \underline{E}^i + \epsilon^i \underline{A}\underline{V}^i \quad (10)$$

The (i+1)th evaluation function $J^{i+1}$ can be determined by the equations (9) and (10) as follows.

$$J^{i-1} = \|E^{i+1}\|^2 \tag{11}$$

$$J^{i-1} = (\underline{E}^i + \epsilon^i \underline{A}\underline{V}^i)^T(\underline{E}^i + \epsilon^i \underline{A}\underline{V}^i)$$

$$= \underline{E}^T\underline{E}^i + \epsilon^i\underline{V}^{iT}\underline{A}^T\underline{E}^i + \epsilon^i\underline{E}^{iT}\underline{A}\underline{V}^i + (\epsilon^i)^2\underline{V}^{iT}\underline{A}^T\underline{A}\underline{V}^i$$

The shoulder suffix T in the above equation stands for a transposed matrix; namely, $\underline{A}^T$ stands for the transposed matrix of the matrix $\underline{A}$.

From the equation (11), the variable $\underline{V}^i$ for minimizing ith evaluation function $\underline{J}^{i+1}$ is given by $$\underline{V} = -\underline{A}^T\underline{E}^i \tag{12}$$

The optimum value of $\epsilon^i$ is $$\epsilon^i = \|\underline{V}^i\|^2 / \|\underline{A}\underline{V}^i\|^2$$

In mathematical model of a control object, such as the furnace 1, parameters are indefinite within a certain range. If the value of $\epsilon$ to be used in actual device is represented by $\epsilon_r$, it is preferable to select it in the following range.

$$0 < \epsilon_r^i \leq \epsilon^i$$

Substitution of the equation (6) to the equation (12) gives $$\underline{V}^i = \begin{bmatrix} v(0) \\ v(1) \\ \cdot \\ \cdot \\ \cdot \\ v(n-1) \end{bmatrix} = - \begin{bmatrix} \bar{B}^T\bar{C}^T, & \bar{B}^T\bar{A}^T\bar{C}^T, & \bar{B}^T\bar{A}^{2T}\bar{C}^T, & \ldots, & \bar{B}^T\bar{A}^{(n-1)T}\bar{C}^T \\ 0, & \bar{B}^T\bar{C}^T, & \bar{B}^T\bar{A}^T\bar{C}^T, & \ldots, & \bar{B}^T\bar{A}^{(n-2)T}\bar{C}^T \\ \cdot & & & & \\ \cdot & & & & \\ \cdot & & & & \\ 0, & & \ldots 0, & , & \bar{B}^T\bar{C}^T \end{bmatrix} \begin{bmatrix} e(1) \\ e(2) \\ \cdot \\ \cdot \\ \cdot \\ e(n) \end{bmatrix} \tag{13}$$

The values of v(0) through v(n) can be determined as follows by using the equation (13).

$$\eta(k) = \bar{A}^T\eta(k+1) + \bar{C}^Te(k+1) \tag{14a}$$

$$v(k) = -\bar{B}^T\eta(k) \tag{14b}$$

here, k varies from 0 to (n−1), and k(n) = 0.

The inventors have found that the calculation according to the equations (14a) and (14b) can be effected by using a dual system with respect to the equations (4a) and (4b), and the present invention is based on such finding. The reason for it will be described now.

In steady state operation of the furnace 1, there are seldom disturbance, and the increment or decrement of the output due to the renewal by the adjustment input (f̂) is irrelevant to the preset temperature values (r) as can be seen from the equation (10). Assuming the absence of the disturbance and the set value input, the equation (4a) and (4b) can be rewritten as follows.

$$X(k+1) = \bar{A}X(k) + \bar{B}\hat{r}(k) \tag{15a}$$

$$y(k) = \bar{C}X(k) \tag{15b}$$

The equations (15a) and (15b) show characteristics of of the enlarged system 40 of FIG. 1 under the conditions that no input is applied from the preset temperature values. Comparing the equations (15a) and (15b) for the enlarged system 40 and the equations (14a) and (14b) for calculation of the adjustment input, it is noted that if the sign at the right side of the equation (14b) should be changed to plus, such equations (14a) and (14b) represent a dual system with respect to the enlarged system 40.

Hence, according to the invention, the error e(k) between the inside temperatures (y) and the preset temperature values (r) is applied to the dual system model 9 under the conditions of no input from the preset temperature values (r), and the renewed value of the adjustment input (f̂) is determined by using the value of the adjustment input (f̂) for the preceding cycle and output v(k) from the dual system model 9 in response to the application of the above error e(k) thereto. Actual calculation is carried out in iteration starting from k = n in the order of n−1, n−2 and so on.

FIG. 11C shows an example of the result of tests on furnace temperature control by the embodiment of FIG. 1 using the adjustment input. The first run considerably deviates from the preset temperature values (r) and the tracking of the inside temperatures (y) to the preset temperature values (r) is low. With the increase of number or runs, i.e., with the increase of repetition of renewals of the adjustment input (f̂), the tracking is improved and effects of disturbance are suppressed.

Thus, the object of the invention is fulfilled, because the apparatus of the invention improves the tracking performance with respect to the operating pattern by using the adjustment input (f̂) and thereby suppresses the furnace temperature change caused by regularly occurring disturbance.

BRIEF DESCRIPTION OF THE DRAWING

Like parts are designated by like numerals and symbols throughout different views of the drawings.

DESCRIPTION OF THE PREFERRED EMBODIMENT

Figure 9:
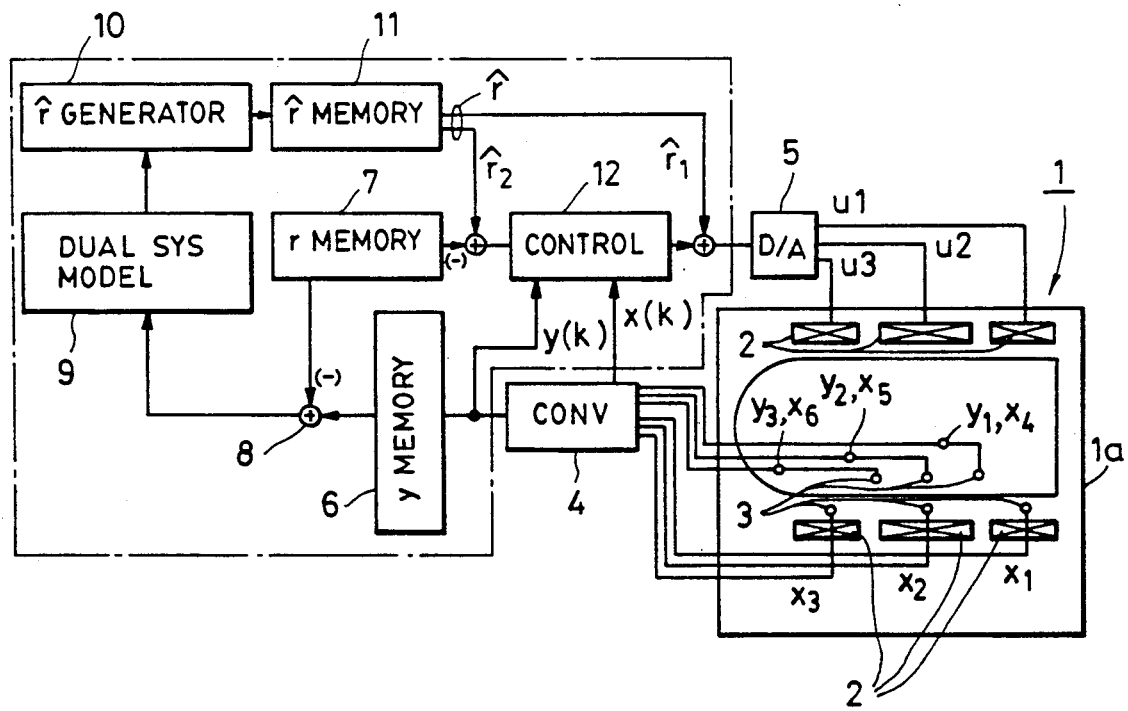
FIG. 9 is a schematic diagram showing the connection of major elements in the embodiment of FIG. 1.

FIG. 9 shows an embodiment of the furnace temperature control apparatus of the invention. The furnace 1 to be controlled by this embodiment has heaters 2 in three blocks. Six temperature sensors 3 measure the temperature at three points in the furnace 1 and at the three blocks of the heaters 2. The output from the six sensors 3 form state variables $x_1$, $x_2$, $x_3$, $x_4$, $x_5$ and $x_6$. The temperatures at the three points in the furnace are controlled variables which can be expressed as $y_1(x_4)$, $y_2(x_4)$ and $y_3(x_6)$.

The output signals from the temperature sensors 3 are applied to a converter 4 for sampling at suitable time intervals. The sampled values are converted into temperature signals at suitable levels and further converted into digital signals. The digital signals corresponding to the above sensor outputs $x_1$ through $x_6$ are used as state variable signals $x(k)$ and output variable signals $y(k)$. The furnace temperature signals $y_1(x_4)$, $y_2(x_6)$ are stored in the output memory 6 as output signal $y(k)$ at each sampling.

Figure 11A:
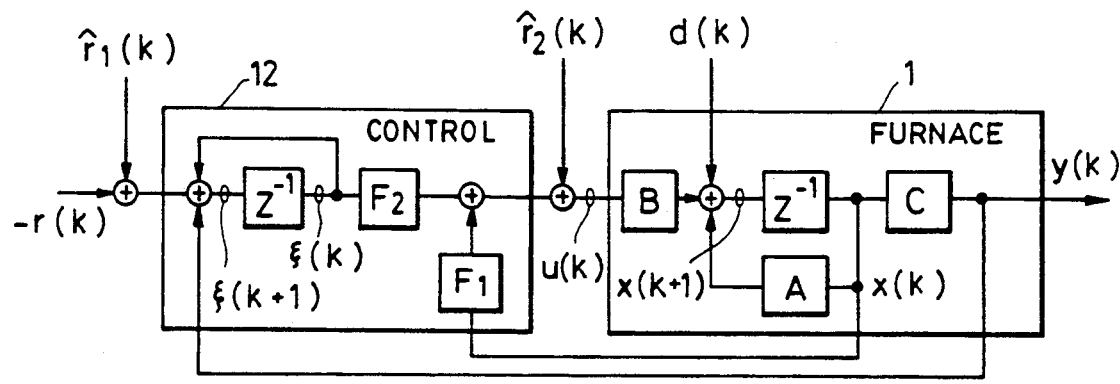
Figure 11B:
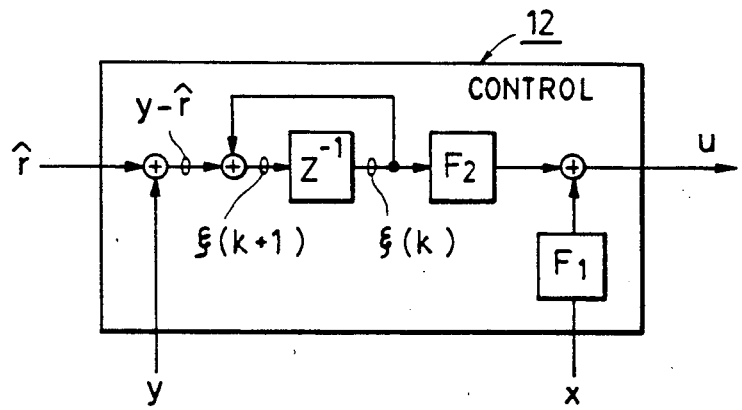
Figure 11C:
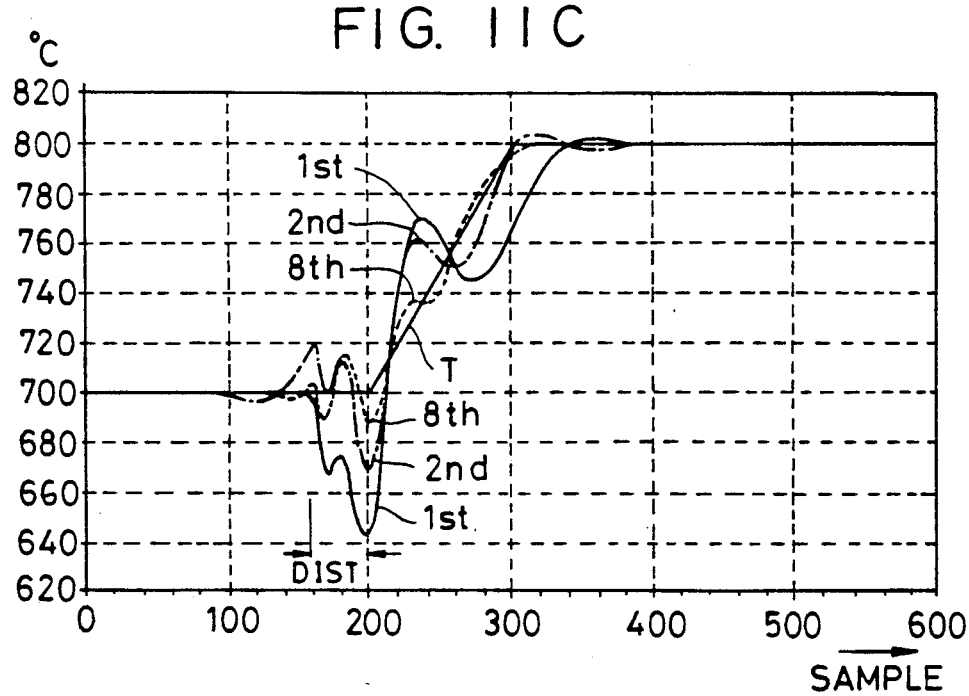

In synchronism with each sampling, the controller 12 reads out those preset temperature values $r(k)$ from the preset value memory 7 which correspond to the sampled values, and at the same time it reads out the corresponding adjustment input ($\hat{r}$). The controller 12 determines manipulating variable signals $u(k)$ based on the sampled data $x(k)$, $y(k)$ and the read-out data $r(k)$, $\hat{r}(k)$. The manipulating variable signals $u(k)$ are applied to the D/A converter 5, where they are converted into analog signals and delivered to the heaters 2 of the furnace 1 as the manipulating variable signals therefor. Thereby, furnace control operation for one sampling is completed. To cover the entire operating pattern, such as that of the curve T of FIG. 11C, the above furnace control operation is repeated by a predetermined number of times, e.g., n times with k from 1 to n. When the furnace output $y(k)$ for the last sampling is stored in the output memory 6, one cycle of the temperature control for the furnace 1 is completed.

Figure 1:
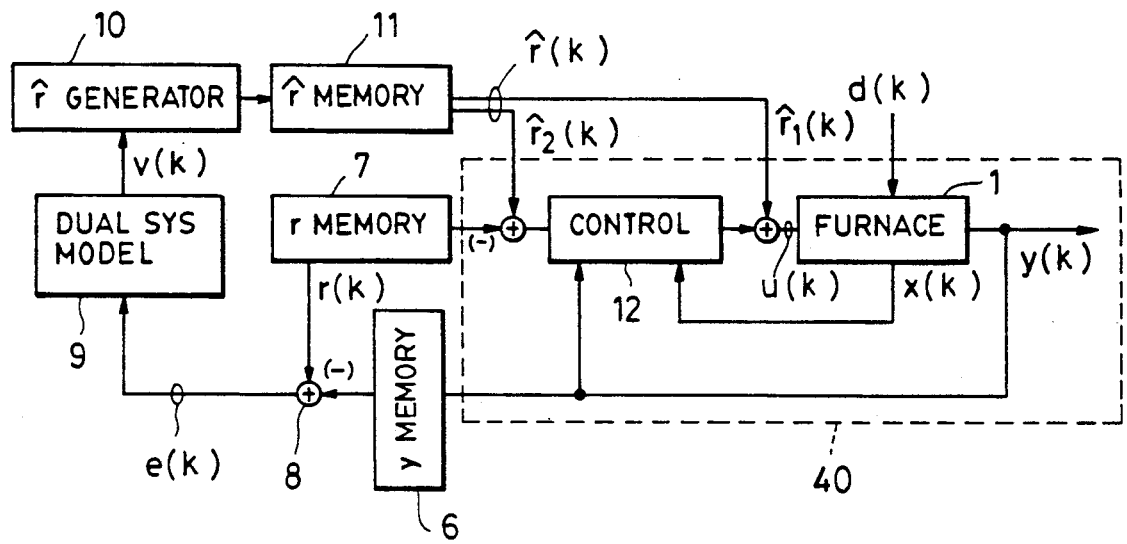
FIG. 1 is a block diagram of a furnace temperature control apparatus using adjustment input according to the invention.

Upon completion of each control cycle, errors $e(k)$ between the output data or inside temperature data $y(k)$ in the output memory 6 and the preset temperature value data $r(k)$ in the preset temperature memory 7 are calculated by an adder 8, and the errors $e(k)$ are applied to the dual system model 9. The dual system model 9 of this embodiment is in "the dual system relationship with" the enlarged system 40 of FIG. 1 under the condition that no preset temperature input is applied thereto. The enlarged system 40 of FIG. 1 consists of the furnace 1 and the controller 12. The output from the dual system model 9 is applied to the adjustment input generator 10 which produces renewed values of the adjustment input $\hat{r}(k)$ to be used in the ensuing operation of the control apparatus of the invention. The adjustment input $\hat{r}(k)$ from the adjustment generator 10 is stored in the adjustment input memory 11.

The operation of this embodiment will be explained by referring to the flow diagram of FIG. 10. When the control starts, initialization takes place in the first step. In the initialization, the preset temperature values for the furnace temperature output are written in the preset temperature values memory 7. Zeros are stored in the adjustment input memory 11 for initialization. Approximate dual system coefficients are set on the dual system model 9. When the controller 12 is of integration type, as shown in FIG. 11B, their control rules $F_1$ and $F_2$ are set.

In the second step, reproduction operation takes place in the following manner. The manipulating variable signals $u(k)$ from the controller 12 are applied to the furnace 1 through the D/A converter 5, so as to control the heaters 2. The state signals $x(k)$ and the output signals $y(k)$ are delivered to the controller 12 through the converter 4. The controller 12 produces the manipulating variable signals $u(k)$ based on the signals $x(k)$, $y(k)$ from the converter 4, preset temperature values $r(k)$ from the preset temperature value memory 7, and the adjustment input $\hat{r}(k)$ from the adjustment input memory 11. The manipulating variable signals $u(k)$ are applied to the furnace 1 through the D/A converter 5 as described above. Thereby, a loop for effecting the reproduction operation is formed. During the reproduction operation of the second step of the flow diagram, the output signal $y(k)$ from the converter 4 are stored in the output memory 6. When the above loop is run by a predetermined number of times for covering the entire operating pattern, e.g., the curve T of FIG. 11C, the reproduction operation is completed.

After the completion of the reproduction operation, adjustment input renewal operation of the third step may start depending on the circumstances. Output values $v(k)$ of the dual system model 9 are determined by the equations (14a) and (14b) in response to application of errors $e(k)$ between the data from the output memory 6 and the data from the preset value memory 7. Then, the adjustment input generator 10 calculates renewed values of the adjustment input $r(k)$ by using the equation (8).

When the adjustment input values are renewed, the reproduction operation starts again by using the thus renewed values of the adjustment input $\hat{r}(k)$. The adjustment input renewal may be effected at the end of each cycle of the reproduction operation. The repetition of the adjustment input renewal will bring the output $y(k)$ of the furnace 1 closer to the preset temperature values ($r$) so as to improve the tracking performance of the controller. When the requirements, such as the level of tracking and others, are met by the repeated renewals of the adjustment input, the adjustment input $\hat{r}(k)$ may be fixed and the step of renewing the adjustment input may be by-passed.

The control system elements in the dash-dot lines of FIG. 9 may be formulated by suitable digital computer software.

Figure 10:
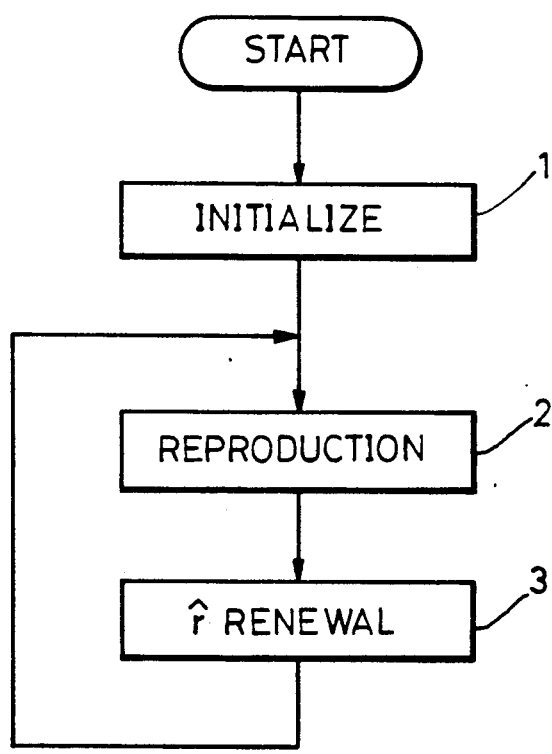
FIG. 10 through FIG. 11C are explanatory diagrams of the operation of the first embodiment illustrated in FIG. 1.

During the repeated runs of the furnace 1 with an identical pattern of temperature change with time, if disturbance repeats regularly by loading and/or unloading of works, the adjustment input renewal in the third step of FIG. 10 may be so effected as to minimize the fluctuation of the furnace inside temperatures y(k) due to such disturbance. The renewed adjustment input $\hat{r}(k)$ for suppressing the effect of the disturbance can be stored in the adjustment input memory 11. When such regular disturbance occurs in the ensuing run, the adjustment input $\hat{r}(k)$ capable of minimizing its effect may be read out from the memory 11, so as to suppress the effects of the disturbance. Further renewal of the adjustment input $\hat{r}(k)$ in response to the ensuing disturbance will still more enhance the suppression of the effect of the repetitive disturbance.

Figure 2:
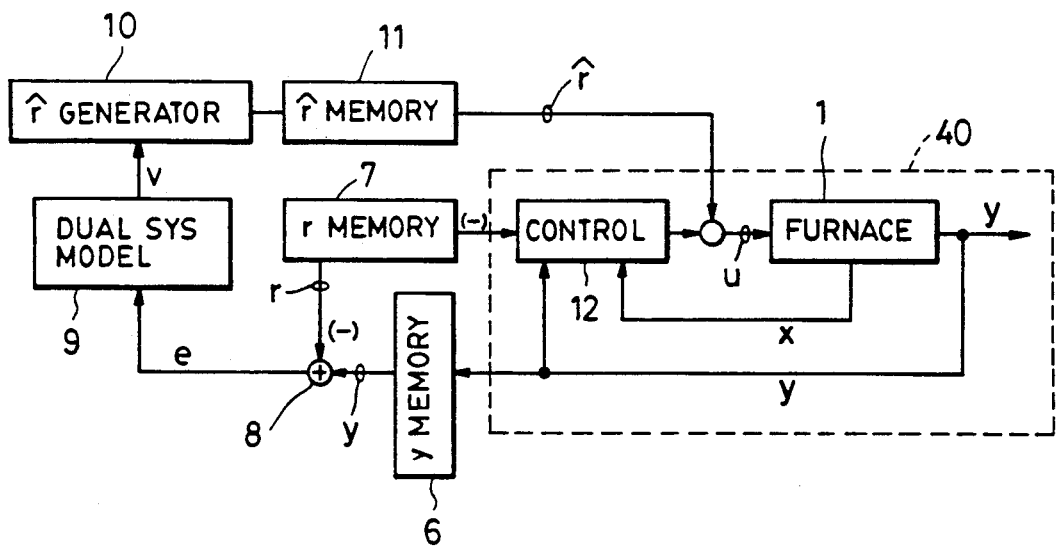
FIG. 2 through FIG. 8 are block diagrams showing other embodiments of the furnace temperature control apparatus of the invention.
Figure 12A:
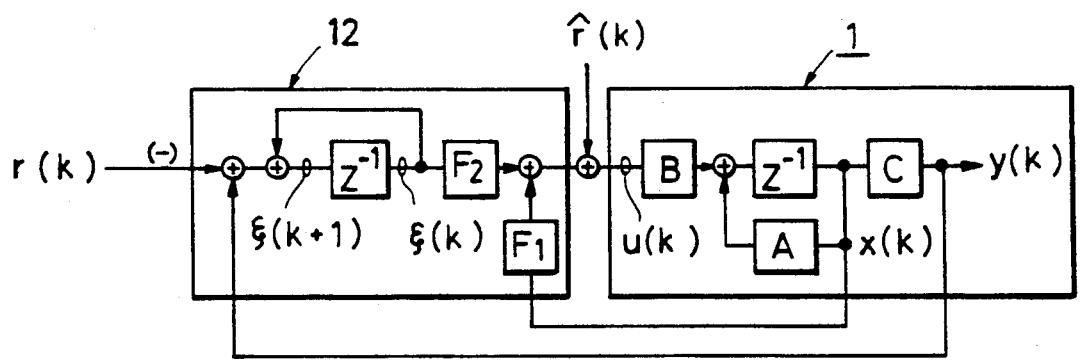
FIG. 12A and FIG. 12B are a functional block diagram of the second embodiment illustrated in FIG. 2, and a graph showing the result of tests made on the second embodiment, respectively.

FIG. 2 and FIG. 12A show an embodiment which applies both the controller output and the adjustment input $\hat{r}(k)$ to the furnace 1. The output of the controller 12 is based on the error between the preset temperature values and the inside temperatures as can be seen from FIG. 1. The adjustment input ($\hat{r}$) is the output from the adjustment input generator 10. If the characteristics of the furnace 1 and the controller 12 are as shown in FIG. 12A, the characteristics of the enlarged system 40 is given by the following equations.

$$\begin{bmatrix} x(k+1) \\ \xi(k+1) \end{bmatrix} = \begin{bmatrix} A + BF_1 & BF_2 \\ C & I \end{bmatrix} \begin{bmatrix} x(k) \\ \xi(k) \end{bmatrix} + \begin{bmatrix} B \\ 0 \end{bmatrix} \hat{r}(k) + \begin{bmatrix} 0 \\ -I \end{bmatrix} r(k) \quad (16a)$$

$$y(k) = [C\ 0] \begin{bmatrix} x(k) \\ \xi(k) \end{bmatrix} \quad (16b)$$

By using the following definitions, equations 17a and (17b) similar to the above-referred equations (4a) and (4b) can be derived from the above equations (16a) and (16b).

$$X(k) = \begin{bmatrix} x(k) \\ \xi(k) \end{bmatrix} \quad \bar{A} = \begin{bmatrix} A + BF_1 & BF_2 \\ C & I \end{bmatrix}$$

$$\bar{B} = \begin{bmatrix} B \\ 0 \end{bmatrix} \quad \bar{G} = \begin{bmatrix} 0 \\ -I \end{bmatrix} \quad \bar{C} = [C\ 0]$$

$$X(k+1) = \bar{A}X(k) + \bar{B}\hat{r}(k) + \bar{G}r(k) \quad (17a)$$

$$y(k) = \bar{C}X(k) \quad (17b)$$

Figure 12B:
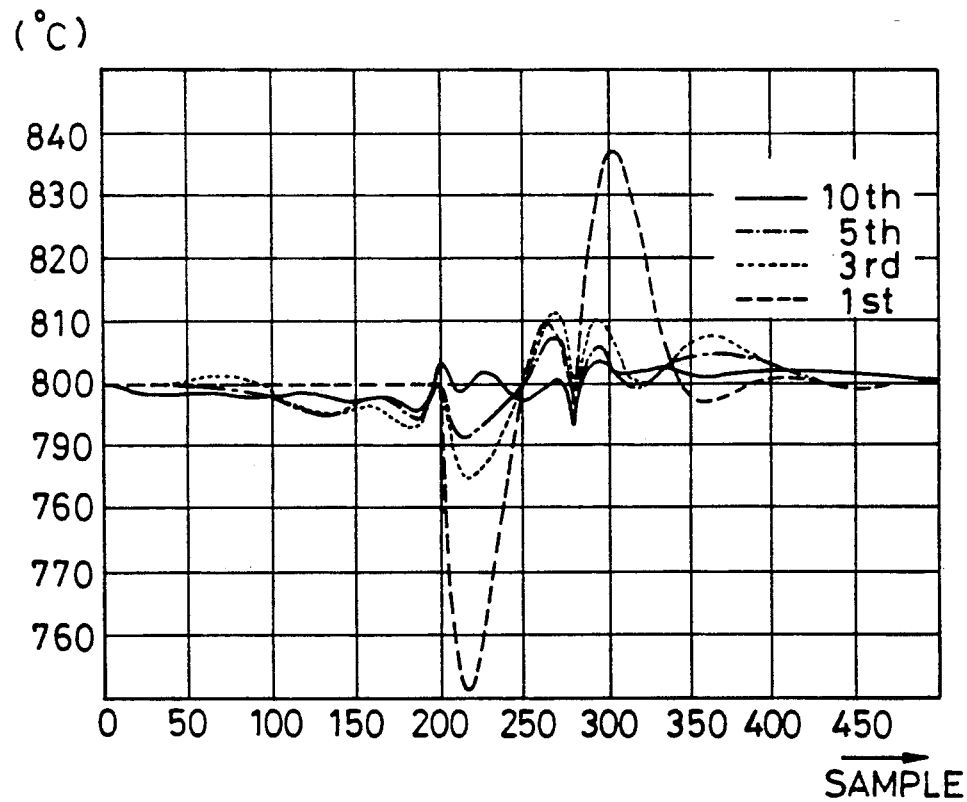

It is possible to determine a dual system model with respect to the equation (17a) and (17b) by using the same method as that which has been described above by referring to FIG. 1. Thus, this second embodiment carries out similar temperature control as the first embodiment. FIG. 12B shows the result of tests made by this second embodiment for suppression of the effect of disturbance.

Figure 3:
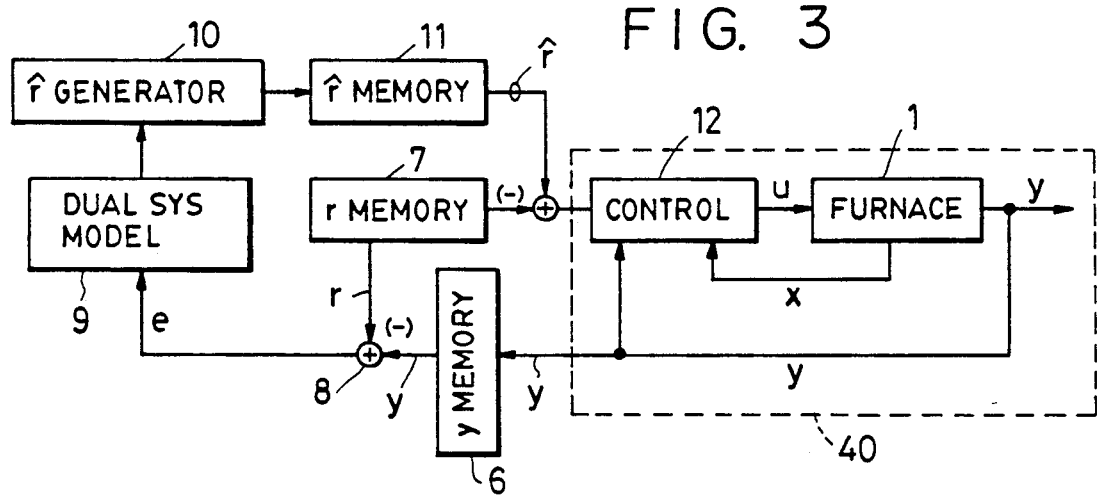
Figure 13:
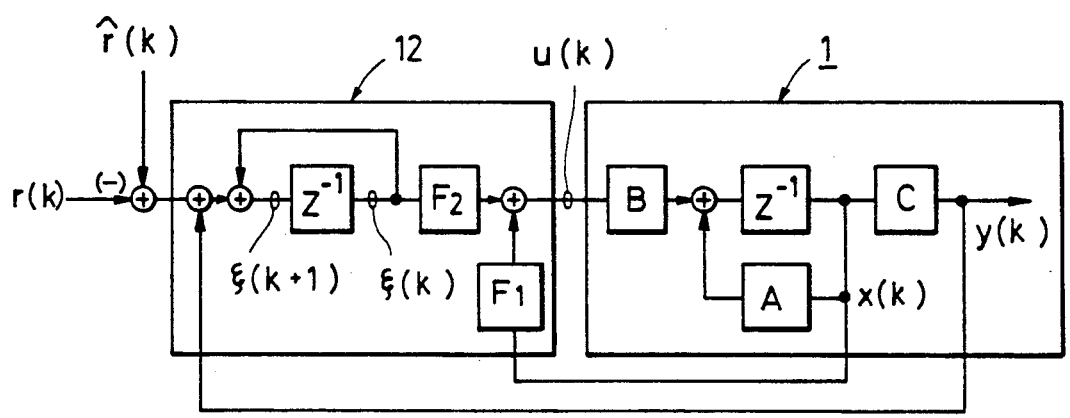
FIG. 13 and FIG. 14 are a functional block diagram of the third embodiment illustrated in FIG. 3, and a graph showing the result of tests made on the third embodiment, respectively.

FIG. 3 and FIG. 13 show an embodiment in which the input to the controller 12 is the difference between the preset temperature values (r) and the corresponding values of the adjustment input (r). The adjustment input (r) is the output from the adjustment input generator 10. If the characteristics of the furnace 1 and the controller 12 are as shown in FIG. 13, the characteristics of the enlarged system 40 of the fourth embodiment is given by the following equations.

$$\begin{bmatrix} x(k+1) \\ \xi(k+1) \end{bmatrix} = \begin{bmatrix} A + BF_1 & BF_2 \\ C & I \end{bmatrix} \begin{bmatrix} x(k) \\ \xi(k) \end{bmatrix} + \begin{bmatrix} 0 \\ I \end{bmatrix} \hat{r}(k) + \begin{bmatrix} 0 \\ -I \end{bmatrix} r(k) \quad (18a)$$

$$y(k) = [C\ 0] \begin{bmatrix} x(k) \\ \xi(k) \end{bmatrix} \quad (18b)$$

By using the following definitions, equations (19a) and (19b) similar to the above-referred equations (4a) and (4b) can be derived from the above equations (18a) and (18b).

$$X(k) = \begin{bmatrix} x(k) \\ \xi(k) \end{bmatrix} \quad \bar{A} = \begin{bmatrix} A + BF_1 & BF_2 \\ C & I \end{bmatrix}$$

$$\bar{B} = \begin{bmatrix} 0 \\ I \end{bmatrix} \quad \bar{G} = \begin{bmatrix} 0 \\ -I \end{bmatrix} \quad \bar{C} = [C\ 0]$$

$$X(k+1) = \bar{A}X(k) + \bar{B}\hat{r}(k) + \bar{G}r(k) \quad (19a)$$

$$y(k) = \bar{C}X(k) \quad (19b)$$

Figure 14:
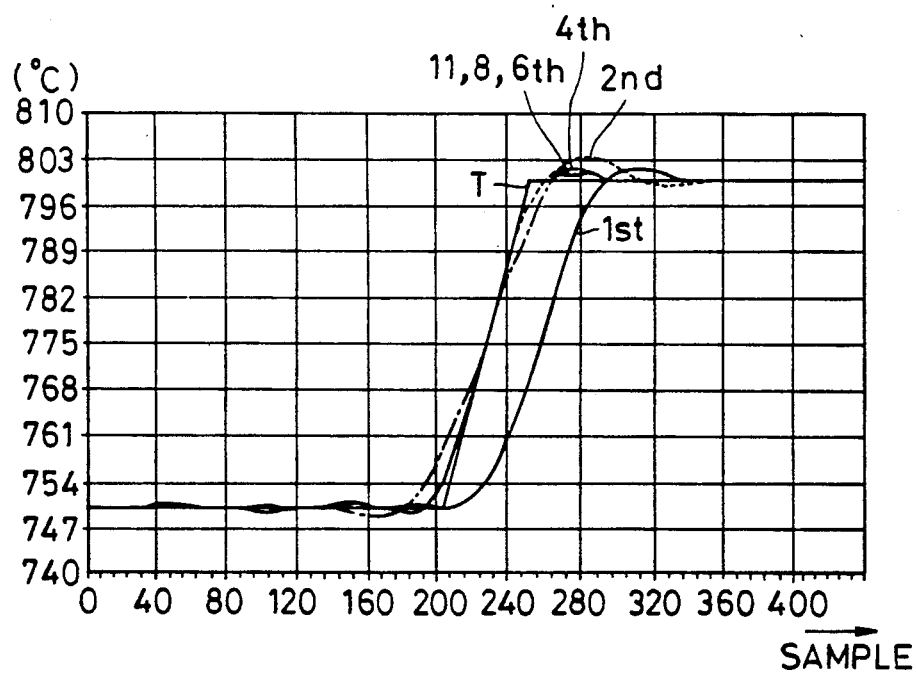

It is possible to determine a dual system model with respect to the equations (19a) and (19b) by using the same method as that which has been described above by referring to FIG. 1, so as to derive output v(k) from the dual system model. Thereby, this third embodiment can be used to carry out similar temperature control as the first and second embodiments. FIG. 14 shows the result of tests on furnace temperature control by using the adjustment input produced by the third embodiment.

Figure 4:
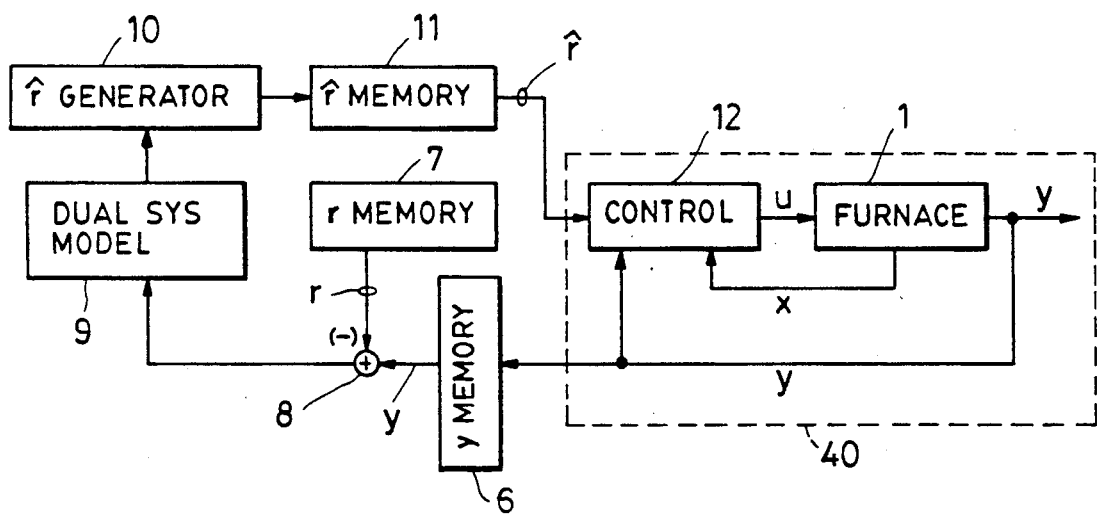
Figure 15:
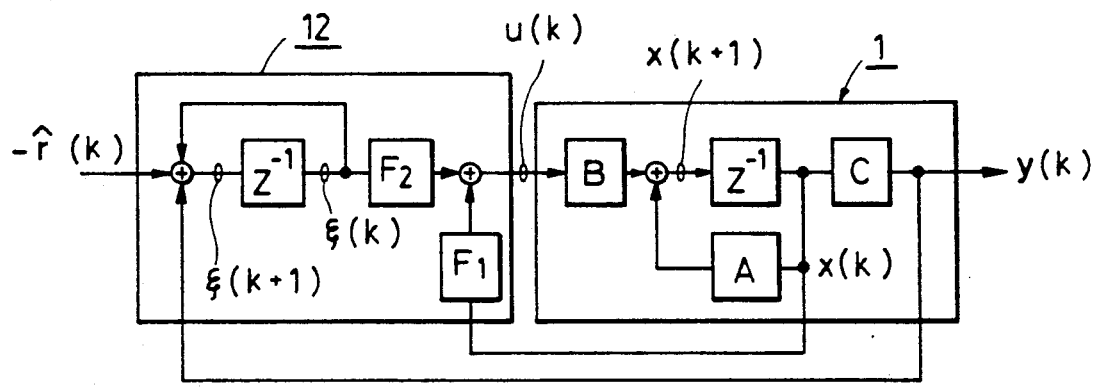
FIG. 15 is a functional block diagram of the fourth embodiment as illustrated in FIG. 4.
Figure 16:
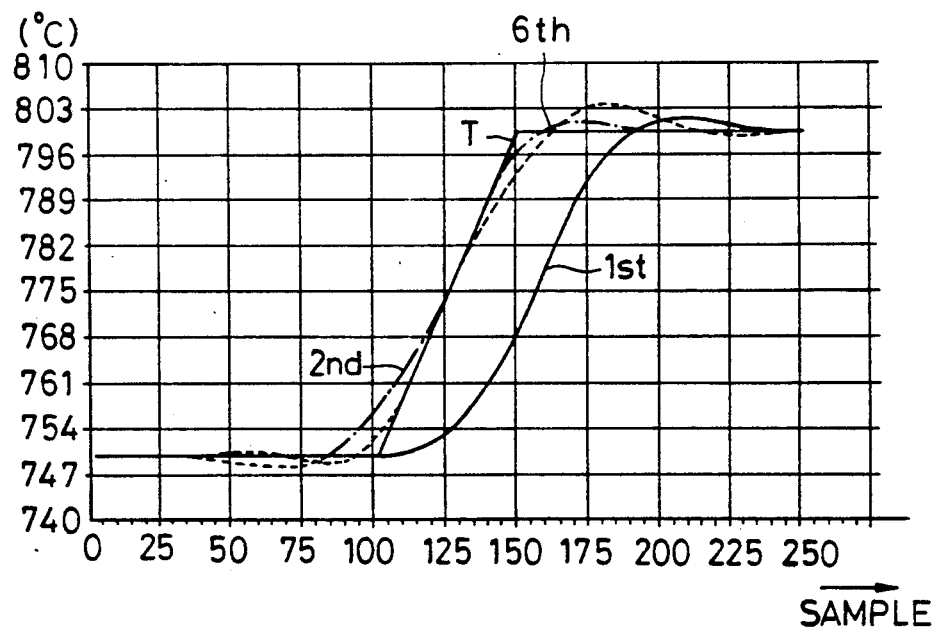
FIG. 16 shows a graph of the results of tests carried out on the fourth embodiment.

The fourth embodiment shown in FIG. 4 and FIG. 15 uses the adjustment input ($\hat{r}$), instead of the preset temperature values (r), as the input to the controller 12. FIG. 16 illustrates the result of tests made on this fourth embodiment.

The inventors also have found that if a weight matrix W is added in the following manner to the evaluation function J of the equation (9), the performance of the furnace temperature control apparatus can be further improved.

$$J = \|W\underline{E}\|^2, \text{ here, } W = W^T \quad (20)$$

Figure 17A:
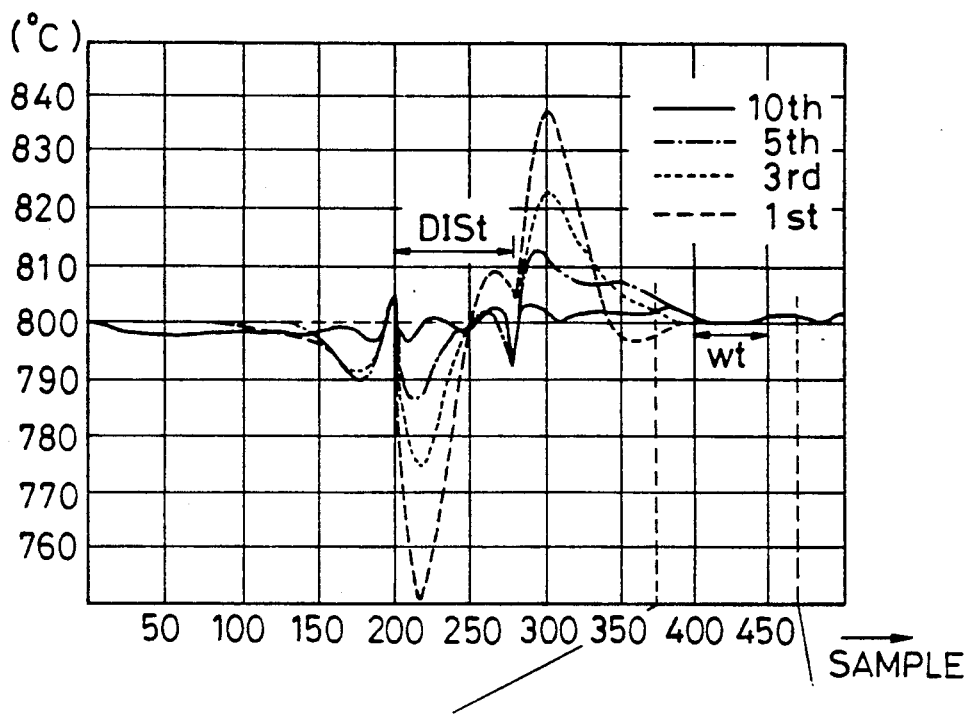
FIG. 17A and FIG. 17B are graphs showing the result of special tests on the embodiment of FIG. 2 by applying certain weight to signals.
Figure 17B:
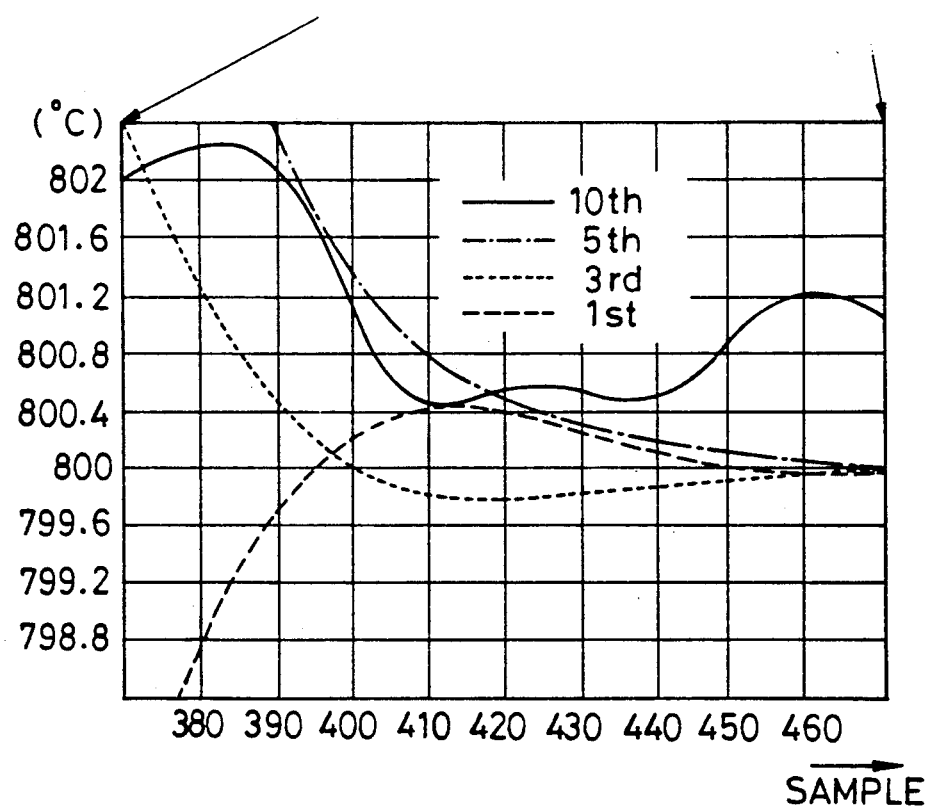

Such addition of the weight matrix is particularly effective in achieving close trailing of the inside temperatures (y) to the preset temperature values (r) in a specific section of the control range. FIG. 17A and FIG. 17B show the improved suppression of disturbance influence by adding a suitable weight matrix to the evaluation function J in the embodiment of FIG. 2 while maintaining the use of the adjustment input ($\hat{r}$). In this case, the optimum value of the constant $\epsilon^i$ is given by $$\epsilon^i = \|\underline{V}^i\|^2 / \| W \underline{A} V^i \|^2$$

here. $\underline{V}^i = -\underline{A}^T W^T W \underline{E}^i$

Figure 5:
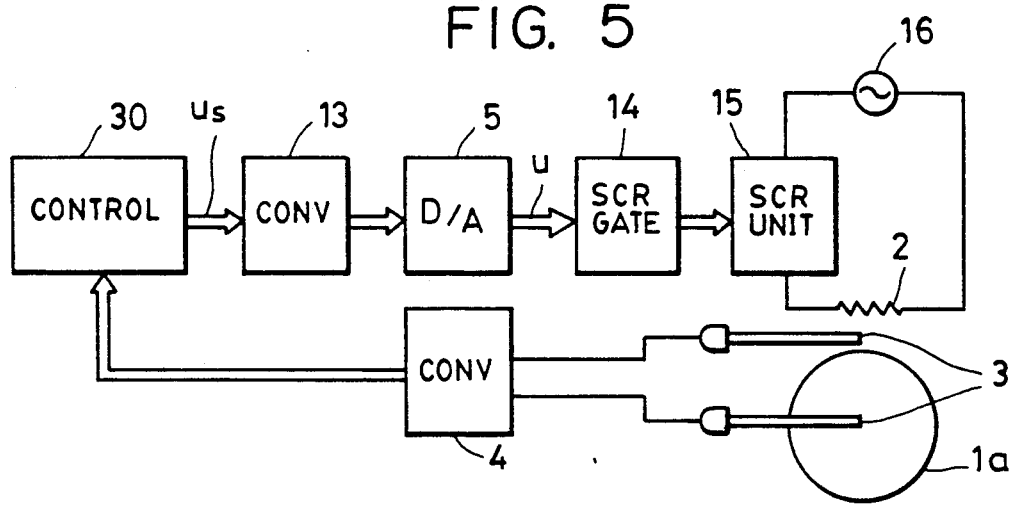

FIG. 5 shows another embodiment of the invention, in which heaters 2 of the furnace body 1a are energized by an AC power source 16 through an SCR unit 15. The output from the temperature sensors 3 are converted by a converter 4 to a level suitable for control circuits, and then delivered to a controller 30. This controller 30 includes the elements enclosed by the dash-dot lines of FIG. 9; i.e., various memories, the dual system model 9, the adjustment input generator 10, the controller 12, and the like. The output $u_s$ from the controller 30 is transmitted through the D/A converter 5 to the SCR gate circuit 14 as the gate signal u thereof. The converter 13 is, in effect, to modify those signals being made non-linear in the SCR gate circuit 14 and the SCR unit 15 in such a manner that the overall furnace temperature control apparatus functions as a linear system. The power to the heaters 2 are regulated in response to the gate signal u.

Figure 18A:
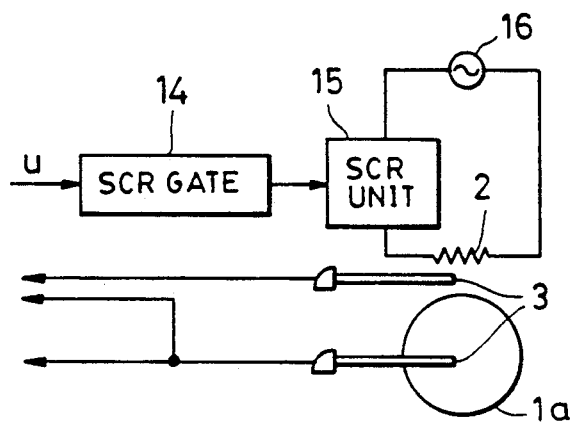
FIG. 18A and 18B are a block diagram and a graph showing the formation and characteristics of a prior art system relating to the embodiment of FIG. 5, respectively.

For reference, FIG. 18A shows a temperature control system which uses a conventional SCR unit 15 but not the converter 13. In this case the heater power P in terms of the input u to the SCR gate circuit 14 is given by $$P = K \int \sin^2(\pi u) du \quad (21)$$

here, K is a constant.

Figure 18B:
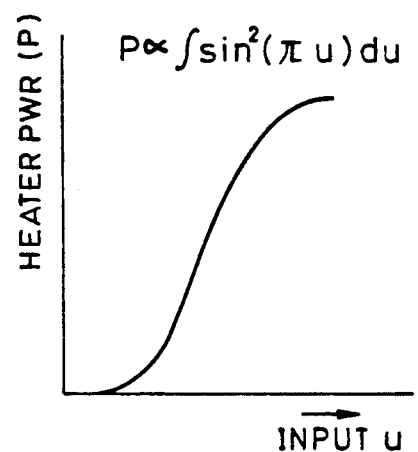

FIG. 18B shows the input-output characteristics of the a conventional SCR control circuit, which is apparently non-linear. The furnace temperature control apparatus of the invention provides linear control, and the non-linear characteristics of FIG. 18B may jeopardize the operation of the apparatus and make its control unstable. The converter 13 of FIG. 5 is connected to the output of the controller 30 to linearize such non-linear control system. The characteristics of the converter 13 can be determined in the following manner.

Rewriting the equation (21)

$$\int \sin^2(\pi u) du = u/2 - \{\sin(2\pi u)\}/(4\pi) \quad (22)$$

After multiplying $\alpha$ to both sides of the equation (21), it is normalized so that, when the u varies 0 to 1, $\alpha P$ also varies 0 to 1. From the equation (21) and (22), $\alpha P$ is given by $$\alpha P = u - \{\sin(2\pi u)\}/(2\pi) \quad (23)$$

As to the characteristics of the converter 13, when the output from the D/A converter 5 is u, the input $u_s$ to the converter should satisfy the following conditions in view of the equation (23).

$$u_s = u - \{\sin(2\pi u)\}/(2) \quad (23a)$$

In the converter 13, the following u is calculated by the equation (23a) by using a suitable method, for instance the Newton-Raphson's method. With the above conversion, the overall control system is linearized and stabilized.

$$u_{k+1} = u_k - f(u_k)/f(u_k)' \quad (24)$$

Here, $f(u_k)'$ is the derivative of $f(u_k)$.

$$u_{k+1} = u_k - \frac{u_s - u_k + \{\sin(2\pi u_k)\}/(2\pi)}{-1 + \cos(2\pi u_k)} \quad (25)$$

The calculation of the equation (25) is iterated until the following condition is reached.

$$\epsilon > |u_{k+1} - u_k| \quad (26)$$

here, $\epsilon$ is a constant.

Figure 6:
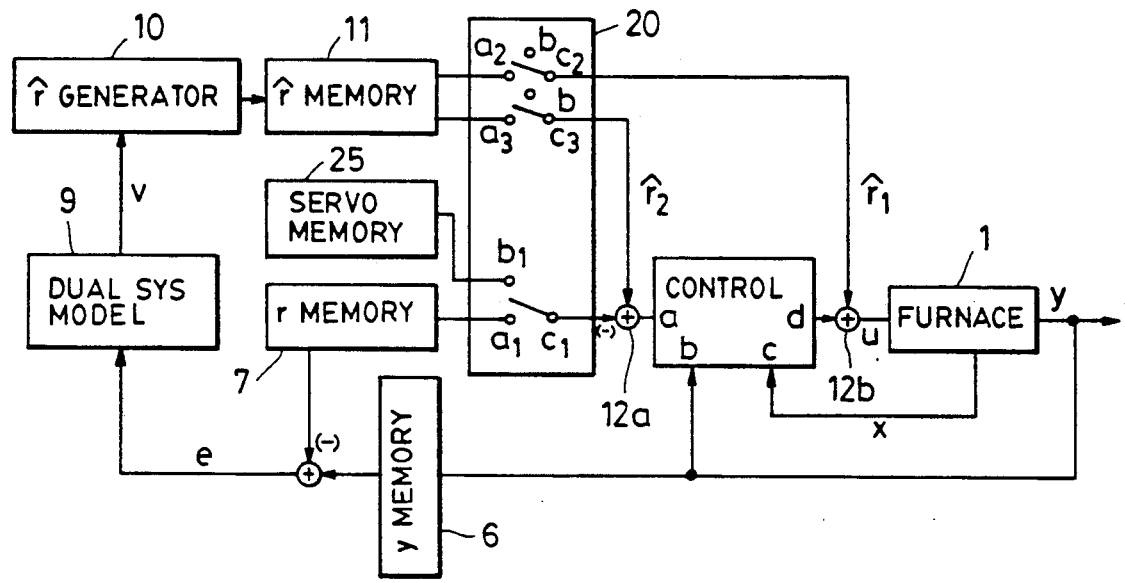

FIG. 6 shows another embodiment of the invention which uses a servo memory 25 and a switch 20. The switch 20 has a contact $a_1$ connected to the preset temperature values memory 7, a contact $b_1$ connected to the servo memory 25, and a movable contact $c_1$ connected to the target value side end of an input side adder 12a of the controller 12.

The adjustment input memory 11 of this embodiment is connected through the switch 20 to both the input side adder 12a and the output side adder 12b of the controller 12 at their adjustment input side ends. In particular, one adjustment input signal $û_1$ from the adjustment input memory 11 is applied to the adjustment input side end of the controller output side adder 12b through the fixed contact $a_2$ and movable contact $c_2$ of the switch 20. The other adjustment input signal $û_2$ from the adjustment input memory 11 is applied to the adjustment input side end of the controller input side adder 12a through the fixed contact $a_3$ and movable contact $c_3$ of the switch 20.

When the adjustment input (û) is used but servo input is not used, the movable contacts $c_1$, $c_2$, and $c_3$ are turned and connected to the fixed contacts $a_1$, $a_2$, $a_3$ corresponding to the adjustment input. The fixed contact $a_1$ is connected to the preset temperature value memory 7, so that when the adjustment input (û) is used the preset temperature values (r) are also used. When the servo input is used but the adjustment input is not used, the movable contact $c_1$ is switched to the fixed contacts $b_1$ on the side of the servo memory 25, while the movable contacts $c_2$ and $c_3$ leave the above-referred contacts $a_2$ $a_3$ and switched to corresponding idle contacts b, respectively.

Figure 19:
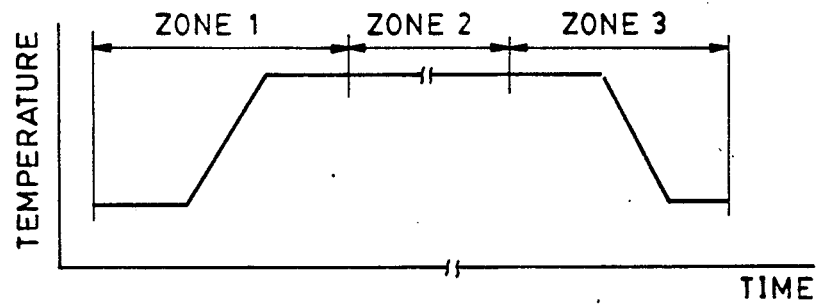
FIG. 19 and FIG. 20 are graphs illustrating temperature change patterns which are used in the description of the embodiment of FIG. 6, respectively.

The operation of the embodiment of FIG. 6 will be described now by referring to FIG. 19 showing stepped change of the preset temperature values (r). In the zones 1 and 3 where furnace temperature should be changed, the furnace 1 is controlled by the furnace temperature control apparatus using the adjustment input (û), such as the embodiment of FIG. 1. On the other hand, in the zone 2 where temperature is kept constant, the furnace 1 is controlled by a conventional servo system.

Thus, for operation of the zones 1 and 3, the movable contacts $c_1$, $c_2$, and $c_3$ of the switch 20 are turned and connected to the fixed contacts $a_1$, $a_2$, $a_3$ corresponding to the adjustment input, respectively, so as to effect the control of the invention for improving the tracking performance at each reproduction operation. When the furnace operation proceeds to the zone 2, the movable contacts $c_2$ and $c_3$ of the switch 20 are switched from the fixed contacts $a_2$ and $a_3$ to the corresponding idle contacts b, while its movable contact $c_1$ is switched to the fixed contacts $b_1$ on the side of the servo memory 25, so as to effect the servo system control by connecting the servo memory 25 to the controller 12.

Figure 20:
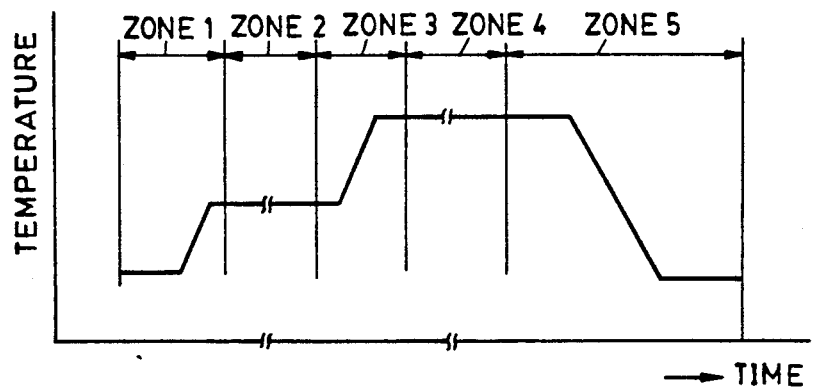

As compared with the case of using the furnace temperature control apparatus of the invention for the entire operating period, the use of suitable conventional control system at a part of the operation period enables a reduction of the memory size. Even when the temperature level for the zone 2 is changed for each run, the conventional servo control can be used with the furnace temperature control with the adjustment input of the invention. The number of zones is not limited to three as in FIG. 19, but furnace operation with any number of zones can be controlled by the embodiment of FIG. 6; for instance, five zones in FIG. 20.

Figure 7:
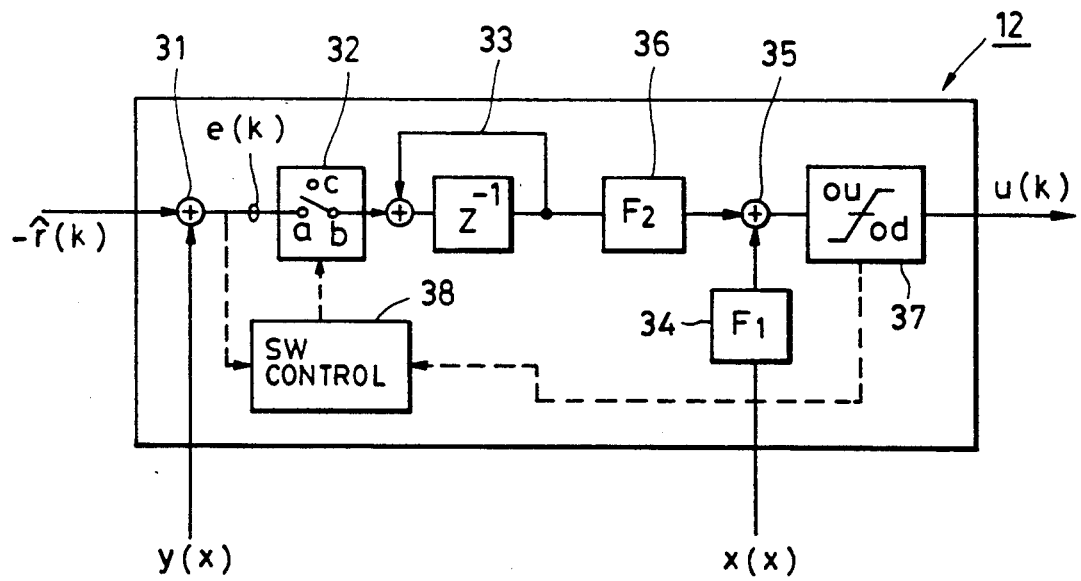

FIG. 7 shows the block diagram of a controller which can be used in the furnace temperature control apparatus of the invention. A first adder 31 on the input side produces the difference between the inside temperatures (y), or furnace output, and the adjustment input (r) and connects the difference to the fixed contact a of switch 32. The switch 32 has a movable contact b connected to an integrator 33, so that when the movable contact b is connected to the fixed contact a, the integrator 33 receives the above difference from the first adder 31. A fixed contact c of the switch 32 remains open. Gains 34 and 36 having matrix values $F_1$ and $F_2$ are connected to a second adder 35, so that the sum of a product of output from the integrator 33 with the gain $E_2$ and a product of controlled state x with the gain $F_1$ is produced. The matrices $F_1$ and $F_2$ are determined, for instance, by control theory of servo system.

The sum from the second adder 35 is limited by a limiter 37 connected to the adder 35, and then delivered to the outside as the output (u) from the controller, so as to be used as manipulating variable signals to the object being controlled. A switch control means 38 has inputs connected to the first adder 31 and the limiter 37, and its output is connected to the switch 32. The switch control means 38 controls the switch 32 as shown in the schedule of the table below depending on the output e(k) from the first adder 31 and the conditions of the limiter 36.

| Conditions* | Switch 32 |
|---|---|
| u(k) > ou and e(k) < 0 | Open (contact b on c side) |
| u(k) < od and e(k) > 0 | Open (contact b on c side) |
| All other conditions | Closed (contact b on a side) |

*ou: upper limit
od: lower limit
u(k): manipulated variable (output from limiter 37)
e(k): output from the adder 31

Figure 21:
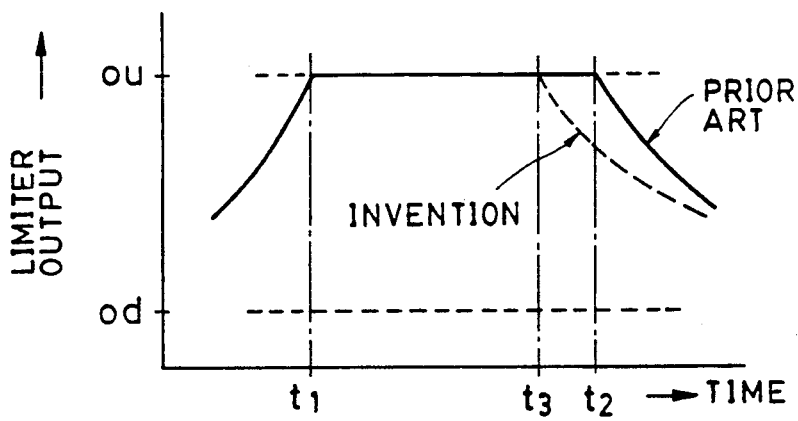
FIG. 21 and FIG. 22 are graphs for the description of the embodiment FIG. 7, respectively.
Figure 22:
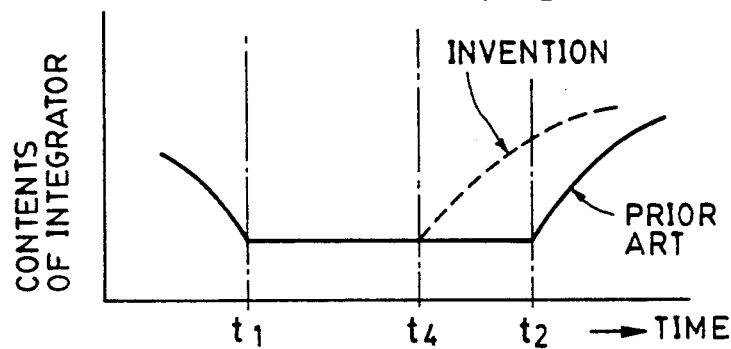

FIG. 21 shows the manipulating variable u(k) (output from the limiter 37) of the invention in comparison with prior art, and FIG. 22 shows the contents of the integrator 33 in comparison with prior art. Generally speaking, certain limit is applied to the output from a controller due to physical reasons, but manipulating variable in control theory is calculated without any limit on the output. In conventional systems, when the integrator 33 is stopped due to limiter operation, it takes a long time for the integrator to resume its operation because the integrator contents at the time of stop is retained. With the invention, the output from the first adder is monitored together with the integrator contents, so that integrator return time is made shorter and the control system is made more stable as compared with the prior art.

Reasons for the shorter return time of the integrator will be described now. Referring to FIG. 21, when the output is limited by the upper limit ou at time $t_1$, the integrator contents of the prior art stays at the lowest level until the time $t_2$ when the limiter output starts to leave the upper limit. On the other hand, with the present invention, when the output from the first adder 31 starts to increase at time $t_4$ even before the above time $t_2$, the switch 32 is closed and positive value is applied to the integrator so as to start the increase of the integrator contents. Whereby, the response is made faster. In the prior art, the integrator remains inoperative and the limiter output does not start to decrease until the time $t_2$ even after the output from the second adder 35 becomes below the upper limit ou. On the other hand, with the present invention, the integrator contents increases by the increased output from the first adder 32 even before the time $t_2$, so that when the output from the second adder 35 becomes below the upper limit ou at time $t_3$ the limiter output also starts to decrease. Thus, the response of the control system becomes quicker.

Figure 8:
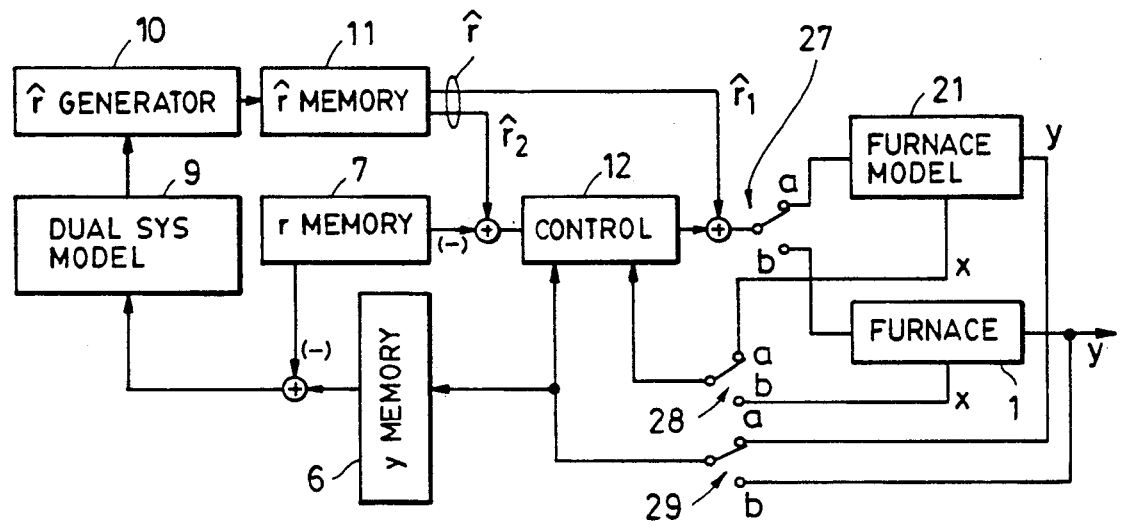

FIG. 8 shows a further embodiment of the invention which uses a furnace model. An operating switch 27 selectively connects the manipulating variable signal u(k) from the controller 12 to the input side of a furnace model 21 or to the input side of the furnace 1. The state signal receiving end of the controller 12 is selective connected, by a state switch 28 to the state output side of the furnace model 21 or to the state output side of the furnace 1. The output y(k) receiving end of the controller 12 is selectively connected by an output switch 29 to the output side of the furnace model 21 or the output side of the furnace 1. The furnace model 21 is produced either by computer simulation or hardware in such a manner that it behaves in the same way as the furnace 1 as far as the temperature control is concerned.

Figure 23:
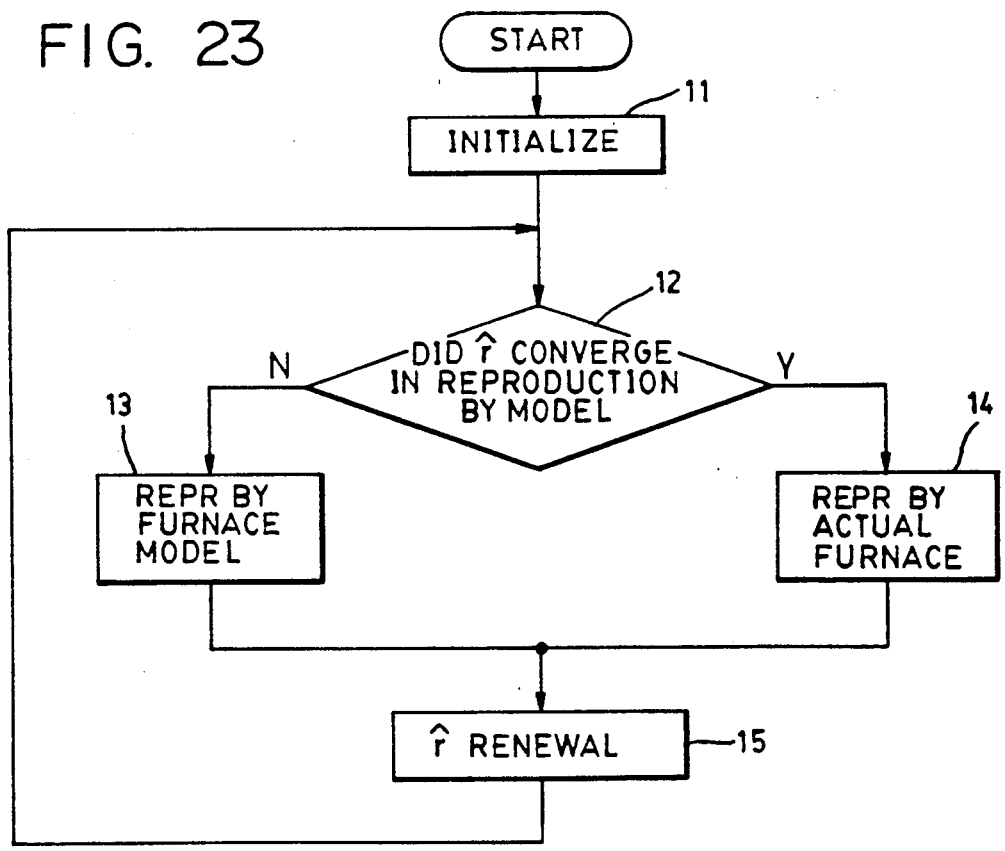
FIG. 23 is a flow diagram of the embodiment FIG. 8.
Figure 24:
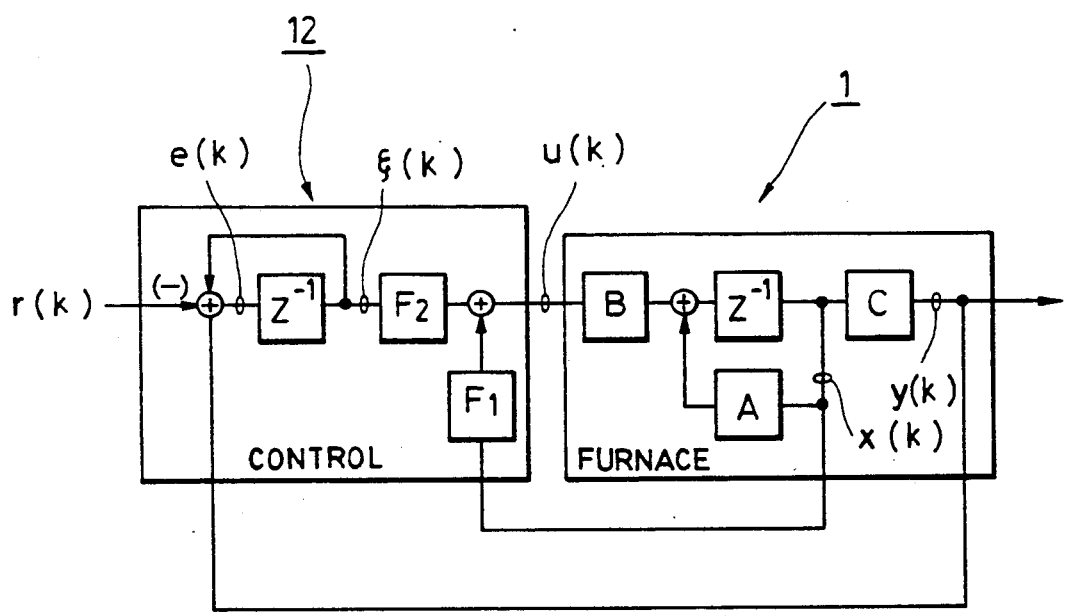
FIG. 24 is an explanatory diagram of a controller of prior art.

The operation of the embodiment of FIG. 8 will be explained by referring to the flow chart of FIG. 23. At the start, initialization takes place in first step. Not only various coefficients on the control apparatus side but also various constants on the side of furnace model 21 are set. At first, the operating switch 27, the state switch 28 and the output switch 28 are all turned to the side of the furnace model 21.

After the initialization, reproduction operation takes place on the furnace model 21 in the second step while monitoring the answer to the question "has the adjustment input (r̂) converged?". If the answer to the question is negative, control proceeds to the third step to repeat the reproduction operation on the furnace model 21. If the answer to the above question is positive, the control proceeds to the fourth step to run the furnace 1. After the reproduction operation, the renewal of the adjustment input (r̂) take places in the fifth step.

With the embodiment of FIG. 8, suitable adjustment input (r̂) satisfying various requirements is generated by the furnace model 21 at first, and the actual furnace 1 is run with the thus generated adjustment input (r̂). Hence, it is ensured to meet various requirements with a small number of reproduction operations on the actual furnace.

As described in detail in the foregoing, the furnace temperature control apparatus of the invention applies adjustment input (r̂) to an enlarged system including the furnace and the controller therefor, and the adjustment input (r̂) is renewed by using an adjustment input generator and a dual system model with respect to the above enlarged system under certain conditions. The enlarged system includes thermal properties of the furnace and the characteristics of the controller. The adjustment input generator renews the value of the adjustment input (f̂) by using their values in the preceding furnace run and the output v(k) from the dual system model in response to the application of the error e(k) between the measured furnace inside temperatures (y) and the preset temperature values (r). Whereby, the invention achieves the following outstanding effects.

(a) An improvement in tracking performance to a given pattern of temperature change with time.
(b) Suppression of furnace temperature fluctuation due to disturbance.
(c) Adaptability to non-linear elements, such as SCR controlled heaters and the like, while retaining the linearity of the overall control.
(d) Memory capacity can be reduced. If necessary, the apparatus of the invention using a dual system model may be combined with a suitable conventional control system for reducing the memory size.
(e) Quick return of manipulating variable signal to its regular variation after being limited by a limiter.
(g) Optimum value of adjustment input (f̂) with a small number actual furnace runs, due to adaptability to simulators and the like.

What is claimed is:

1. A furnace temperature control apparatus for controlling inside temperatures (y) at selected points of a furnace having heaters so as to repeatedly run the furnace in a certain operating pattern of temperature change with time, said apparatus comprising:
   a preset value memory storing preset temperature values (r) of the operating pattern for certain points in the furnace;
   sensors measuring the inside temperature (y);
   an output memory connected to the sensors to store measured inside temperatures (y);
   a controller adapted to generate output signals to the heaters in response to simultaneous application of said inside temperatures (y) and at least one of the preset temperature values (r) and adjustment input (f̂) to the controller, said output signals from the controller forming at least a part of manipulating variable signals (u) applicable to the heaters of the furnace;
   an enlarged system including said furnace and said controller;
   an adjustment input memory adapted to store the adjustment input (f̂) for each cycle of said repetition, and connected to at least one point of the enlarged system so as to apply the adjustment input (f̂) thereto in synchronism with the application of the inside temperatures (y) to the controller;
   an adder connected to the preset value memory and the output memory so as to determine errors (e) between the preset temperature values (r) and latest inside temperatures (y);
   a dual system model with respect to said enlarged system being connected to said adder and disconnected from the preset temperature values (r); and
   an adjustment input generator connected to both the dual system model and the adjustment input memory so as to renew the adjustment input (f̂) based on a combination of the adjustment input (f̂) values in preceding cycle of said repetition and output (v) from the dual system model in response to application of the errors (e) thereto.

2. A furnace temperature control apparatus as set forth in claim 1, wherein said preset temperature values (r) are applied to input side of said controller, and said adjustment input (f̂) and output signals from said controller are applied to the heaters of the furnace.

3. A furnace temperature control apparatus as set forth in claim 2, wherein said apparatus further comprises: a memory for storing that adjustment input (f̂) which is generated in response to a disturbance occurring regularly in each cycle in the repetition of the certain operating pattern of temperature change, whereby variation of the inside temperatures (y) due to said disturbance is reduced incrementally as said certain operating pattern is repeated.

4. A furnace temperature control apparatus as set forth in claim 1, wherein said preset temperature values (r) and said adjustment input (f̂) are applied to input side of the controller.

5. A furnace temperature control apparatus as set forth in claim 4, wherein said apparatus further comprises: a memory for storing that adjustment input (f̂) which is generated in response to a disturbance occurring regularly in each cycle in the repetition of the certain operating pattern of temperature change, whereby variation of the inside temperatures (y) due to said disturbance is reduced incrementally as said certain operating pattern is repeated.

6. A furnace temperature control apparatus as set forth in claim 1, wherein said adjustment input (f̂) are applied to said controller so as to cause said controller to produce manipulating variable signals (u) to the heaters of the furnace.

7. A furnace temperature control apparatus as set forth in claim 6, wherein said apparatus further comprises: a memory for storing that adjustment input (f̂) which is generated in response to a disturbance occurring regularly in each cycle in the repetition of the certain operating pattern of temperature change, whereby variation of the inside temperatures (y) due to said disturbance is reduced incrementally as said certain operating pattern is repeated.

8. A furnace temperature control apparatus as set forth in one of claims 1-7, wherein said control apparatus further comprises: a means for giving a weight to said error being applied to said dual system model for a certain time period portion of the preset temperature values (r), whereby tracking ability of said adjustment input (f̂) is so improved that the inside temperatures (y) closely track the preset temperature values (r) in said time period.

9. A furnace temperature control apparatus as set forth in one of claims 1-7, wherein said control apparatus further comprises a converter which converts non-linear portion of the manipulating variable signals (u) into linear manipulating variable signals (u).

10. A furnace temperature control apparatus as set forth in one of claims 1-7, wherein said control apparatus further comprises a servo memory storing servo control signals to the heaters, and a switch means which selectively connects said enlarged system to one of said memory storing the adjustment input (f̂) and the memory storing the servo control signals.

11. The furnace temperature control apparatus as set forth in one of claims 1-7, wherein said control apparatus further comprises:
   a limiter adapted to cut off the manipulating variable signals (u) in excess of a certain limit, and a switch means which interrupts input to the enlarged system upon simultaneous occurrence of said manipulating variable signals (u) which exceed said limit and wherein the value of said error does not allow said manipulating variable signals (u) to return within said limit.

12. A furnace temperature control apparatus as set forth in one of claims 1-7, wherein said control apparatus further comprises a furnace model, and a switch means which selectively connects said controller to one of said furnace and said furnace model.

* * * * *